Feb. 26, 1929.
W. A. BRACKEN
1,703,717
AUTOMOBILE AWNING
Filed Nov. 23, 1926  2 Sheets-Sheet 1
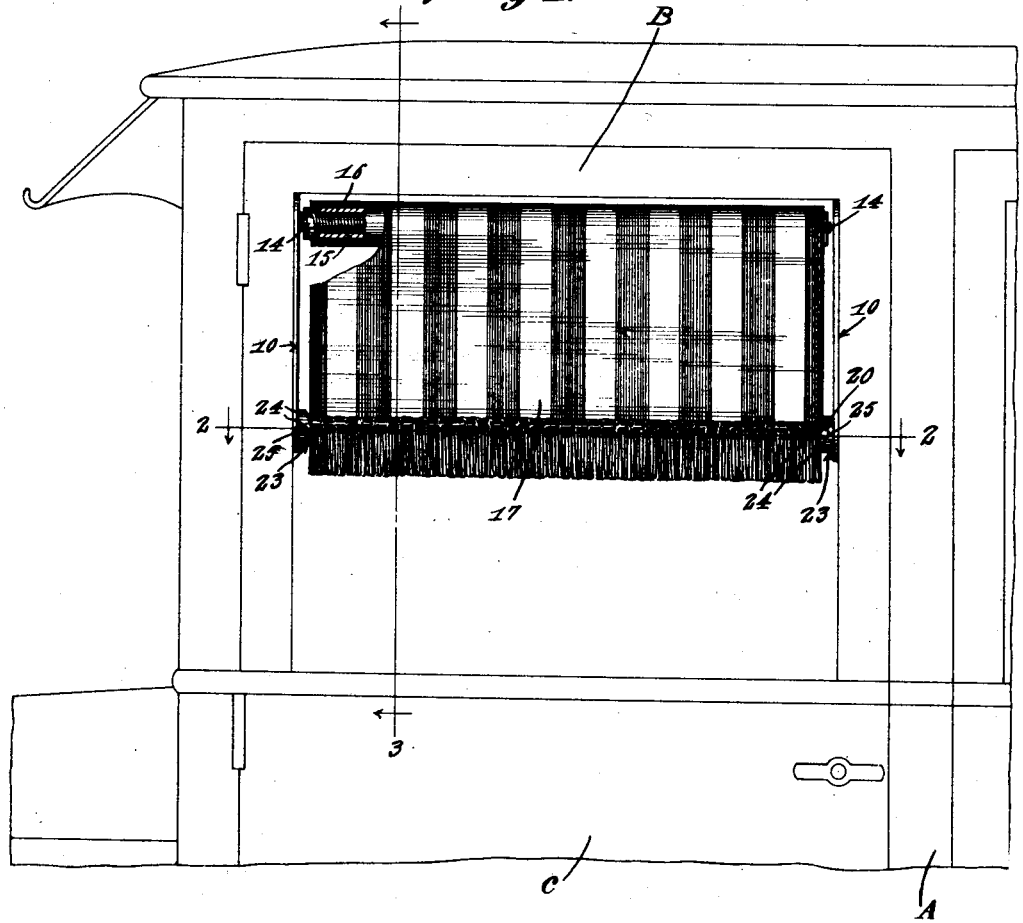
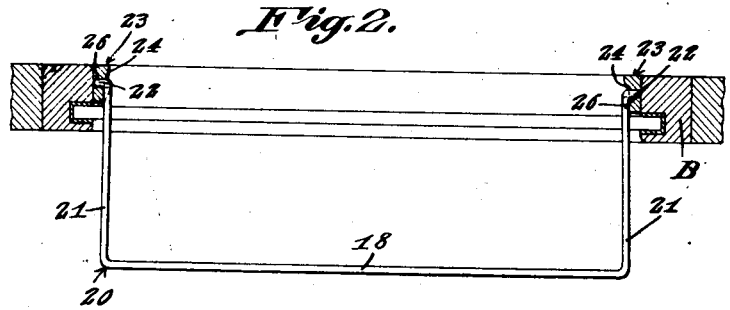
William A. Bracken, INVENTOR.
BY
Geo. F. Kimmel, ATTORNEY.

Feb. 26, 1929. 1,703,717
W. A. BRACKEN
AUTOMOBILE AWNING
Filed Nov. 23, 1926 2 Sheets-Sheet 2
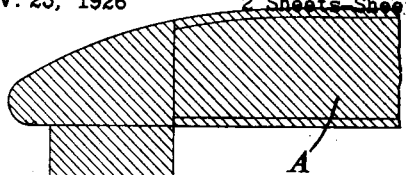
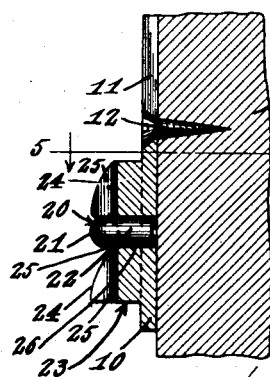
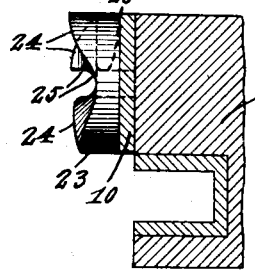
INVENTOR.
William A. Bracken,
BY
Geo. P. Kimmel. ATTORNEY.

Patented Feb. 26, 1929.

1,703,717

UNITED STATES PATENT OFFICE.

WILLIAM A. BRACKEN, OF AUGUSTA, KANSAS, ASSIGNOR OF ONE-HALF TO WILLIAM B. JONES, OF AUGUSTA, KANSAS.

AUTOMOBILE AWNING.

Application filed November 23, 1926. Serial No. 150,270.

The invention relates to an awning and more especially to the class of awning mountings for use on doors, windows, or other like structures, particularly those of automobiles, boats or other vehicles.

The primary object of the invention is the provision of a structure of this character, wherein an awning proper can be readily and conveniently mounted within the frame of a door or window and when so mounted can be conveniently adjusted, whereby the awning proper can be disposed in projected relation at an angle relative to the door or window or may be extended in a vertical plane therewith for shutting out light from without, the mounting being of novel form, so that the awning proper can be rolled up when not in use and will not in any manner detract from the appearance of the door or window, either when in use or not in use.

Another object of the invention is the provision of a structure of this character, wherein the awning proper is at all times under a tension and can be angularly adjusted relative to a door or window or brought to a position to shut out light therethrough, without liability of any distortion of the awning proper when subjected to wind or the rattling or flapping of the same, the awning proper when being extended or rolled up upon its carrier will be moved in a circular course, thus enabling the convenient and ready adjustment of such awning from within an enclosure.

A further object of the invention is the provision of a structure of this character, wherein the awning can be adjusted to varying degrees to serve as a sun-shade for a door or window or the like and will be positively and firmly locked in adjusted position or when rolled up upon its carrier, the mounting for the awning proper being readily applied to or removed from the door or window frame and capable of a wide range of adjustment therein, so that the awning proper can be positioned within said door or window or the like at the fancy of the user.

A still further object of the invention is the provision of a structure of this character, which is extremely simple in its make-up, readily and easily operated with dispatch, conveniently applied to and removed from a door or window or the like, possessing wide range of adjustment both upon the door or window or the like and also the awning proper, neat and attractive in appearance, strong, durable, and inexpensive to manufacture and install.

With these and other objects in view, the invention consists in the features of construction, combination and arrangement of parts, as will be hereinafter more fully described, illustrated in the accompanying drawings, disclosing the preferred embodiments of the invention and pointed out in the claims hereunto appended.

In the accompanying drawings:—

Figure 1 is a fragmetary side elevation of the fore part of an automobile showing the awning mounted upon the door frame thereof and constructed in accordance with this invention, the awning proper being extended at an angle to the door frame and a portion thereof and its carrier being broken away to disclose adjunct parts.

Figure 2 is a sectional view on the line 2—2 of Figure 1 looking in the direction of the arrows with the awning proper removed.

Figure 3 is an enlarged fragmentary vertical sectional view taken on the line 3—3 of Figure 1 looking in the direction of the arrows and showing by arrow marks the direction of adjustment of the awning proper relative to the door frame.

Figure 4 is a sectional view on the line 4—4 of Figure 3 looking in the direction of the arrows.

Figure 5 is a sectional view on the line 5—5 of Figure 4 looking in the direction of the arrows.

Similar reference characters indicate corresponding parts throughout the several views in the drawings.

Referring to the drawings in detail and for the sake of illustration there has been shown a portion of an automobile body A and a window frame B in its door section C of conventional type. Adapted to be located within the window frame B is the awning structure constituting the present invention and the same includes a pair of elongated plates 10 preferably made from metal, cast or otherwise formed and these may be of any desirable shape to suit the emergency of various adaptations for use upon different structures. Each plate at the longitudinal median thereof is formed with aligning elongated slots 11 through which are adapted to be passed fasteners, for example screws 12 which are engaged in the side members of the window frame B for the securing of the plates 10 thereon as is clearly shown in Figures 1 and 3 of the drawings. These elongated slots 11 permit the positioning of the fasteners, such as the screws 12 so that the plates 10 can be adjusted in a maximum range within the window frame B as will be clearly obvious.

The plates 10 each has formed at its upper end a half circular extension 13 and these extensions slightly protrude inwardly of the window frame B and are provided with suitable seats, of the usual form for the trunnions or journals 14 of a shade roller 15, the latter being tensioned and for this purpose is equipped with a coiled spring 16 coacting with such roller, the roller and the spring being of the usual or conventional type employed with window shades.

Fixed to the roller 15 and adapted to be wound thereon and partially or wholly unwound therefrom is a flexible shade 17 constituting the awning proper, the free end of the latter being formed with a casement 18 for accommodating the closed portion 19 of a substantially U-shaped bow or frame 20, preferably made from a single length of rigid wire, the side arms or limbs 21 of which possess inherent resilient qualities and are provided at their free ends with outwardly directed, right angularly disposed extensions providing pivot or trunnion extremities 22 adapted to be swingingly connected with the plates 10 in a manner presently described.

Formed on each plate 10 near its lower end is a boss like bearing 23 provided with an outer rachet face made up from a plurality of cam projections 24 and 24ª, respectively, forming keeper notches 25 therebetween while centrally of the bearing is a circular socket or opening 26 into which is adapted to project the pivot or trunnion 22 of the side arm 21 of the frame or bow 20 and in this manner the latter is swingingly connected to the bearings 23 of the mountings for the awning. The cams 24 may be varied in number and have their cam surfaces gradually rising in the same direction toward the notches 25, so that the side limbs 21 of the bow or frame can float over the cams 24 or ride the same in one direction, that is, in a circuitous or circular course as indicated by the series of arrows in Figure 3 of the drawings. The resiliency of the limbs or arms 21 of the frame 20 will cause the same to frictionally contact with the cams 24 and snap into the notches 25 so that the frame will be locked in adjusted position as shown by full lines and dotted lines in Figure 3 of the drawings.

It is understood of course that the plates 10 are mounted on the side members of the window frame B and the roller 15 is hung in the extensions 13, with the bow or frame 20 positioned between the plates 10 and the limbs or arms 21 engaged in the sockets 26 in the bearings 23 on said plates 10. Now, in normal position the frame or bow 20 is elevated in vertical parallel relation to the plates and in this position the awning 17 will be fully wound upon the roller 15. Should it be desired to extend the awning 17 to the positions shown in Figures 1 and 3 of the drawings an operator grasps the frame or bow 20 pressing outwardly thereupon which will be caused to follow the direction of the series of arrows shown in Figure 3 and when the frame or bow 20 has reached a substantially horizontal plane the limbs or arms 21 riding over the cam ratchet surfaces of the bearings 23 will be caused to snap into the notches 25 and thus latch the frame 20 to hold the awning 17 angularly disposed without the window frame B. If it be desired to extend the awning for the closing of the window frame B the frame or bow 20 is again pressed upon to cause it to move further in the circular course and when such frame reaches its lowest point of movement to be substantially parallel with the window frame B the limbs or arms 21 will snap into the notches 25 in the bearings 23 and thus the awning 17 will be latched in its fullest extended position thereby closing the window frame. If it is desired that the awning 17 be rolled up it is only necessary for the user to pull the frame 20 and the tension of the spring 16 upon the roller 15 will automatically wind the awning 17 upon said roller causing the awning to return to normal position.

It will be apparent that the awning 17 when adjusted is moved in a circular course in one direction, as the cams 24 will retard retrograde movement or counter-clock-wise movement of the awning 17.

By varying the number of cams 24 and the notches 25 therebetween on and in the bearings 23, the said awning can be adjusted in a number of different positions throughout the path of circular movement of the frame or bow 20 connected with said awning 17 in the mounting thereof in the window frame B.

It is obvious that the awning structure is capable of various uses either on houses, vehicles, or the like, without requiring any alteration in the mounting and its mode of operation.

The cam 24ª is reversely beveled on opposite sides of its center to allow the bow to be swung inwardly and downwardly from normal position when the glass in the door or opening is fully closed, so that said awning will be capable of swinging inwardly and downwardly a complete half-circle to its full shading position relative to the glass or opening. It is of course understood that the beveling of the cams 24 and 24ª may be varied, so as to permit the reversal of the path of movement of the shade if found desirable and when the bow or frame 20 has its side limbs 21 engaged in the notches the said bow will be frictionally held to resist the wind and maintain the awning absolutely taut as will be clearly apparent.

It is to be understood that variations, or modifications may be made as come properly within the scope of the appended claims, without departing from the spirit of the invention or sacrificing any of its advantages.

What is claimed is:—

1. In rolling awnings of that type including a spring controlled winding element for the awning body and an adjusting yoke for positioning the awning body against the action of its spring controlled rolling element, the combination with one of the arms of the yoke, said arm having its free end formed with a right angularly disposed extension constituting a pivot therefor, of a combined support and latch consisting of a vertically disposed plate provided at its upper end of its rear edge with a rearwardly directed right angularly disposed extension for rotatably supporting the axis at one end of said element, a boss on the outer side face of said plate at the lower end of the latter, said boss having its outer face formed with a plurality of radially disposed cam projections to provide a latching means for said arm, and said plate and boss formed with an opening, the opening in the plate aligning with the opening in the boss, said pivot extending in said openings whereby the said arm is supported from said plate.

2. In rolling awning structures of that type including a spring controlled winding element for the awning body, the combination of an adjusting yoke for positioning the awning body against the action of its spring controlled rolling element, said yoke having resilient arms, each of said arms having its free end formed with a right angularly disposed extension providing a pivot, of a vertically disposed plate provided at the upper end of its rear edge with a rearwardly directed, right angularly disposed extension for rotatably supporting the axis at one end of said element, a boss on the outer side face of said plate at the lower end of the latter and extending in a direction at right angles with respect to that extension supporting the axis at one end of said element, said boss having its outer face formed with a plurality of radially disposed cam projections to provide a latching means for an arm of the yoke, said plate and boss formed with registering openings, and the pivot of said arm mounted in said openings whereby such arm will be supported from said plate.

In testimony whereof, I affix my signature hereto.

WILLIAM A. BRACKEN.